UNITED STATES PATENT OFFICE.

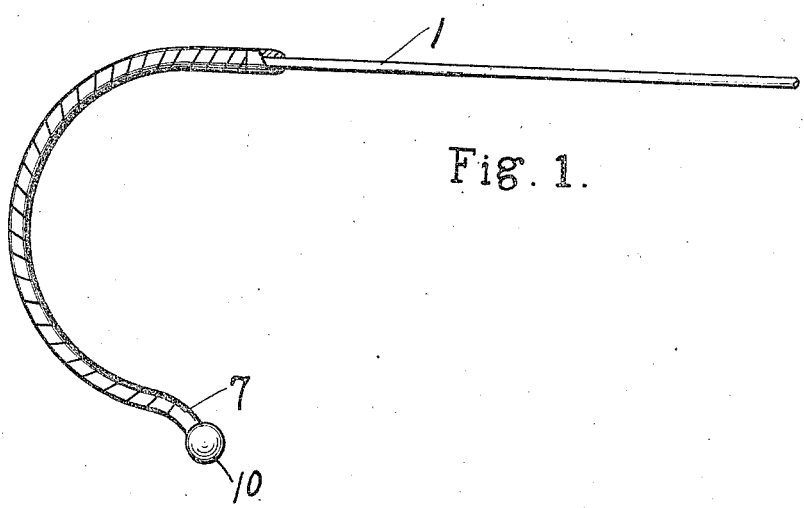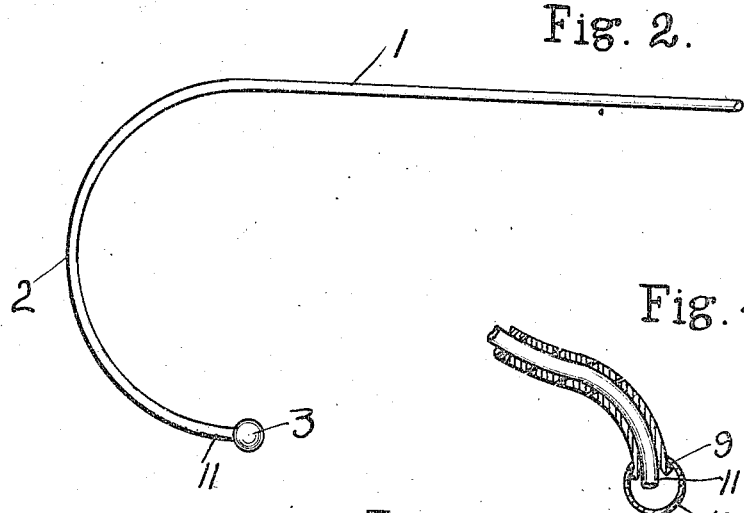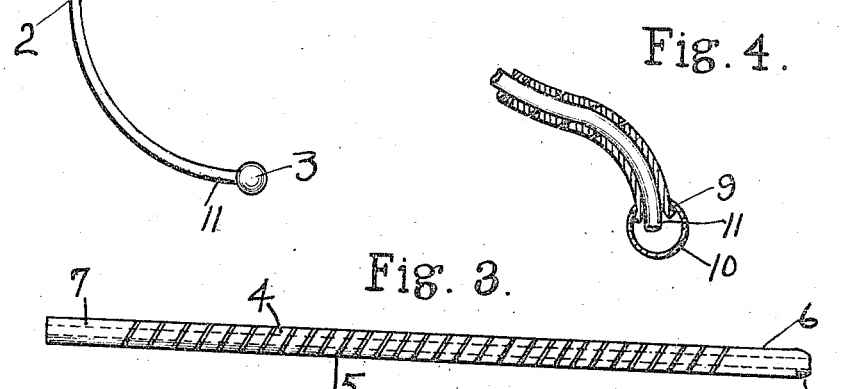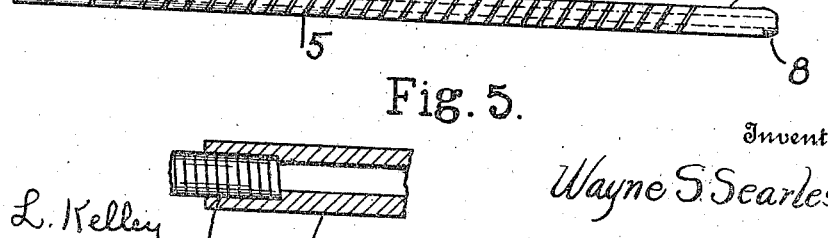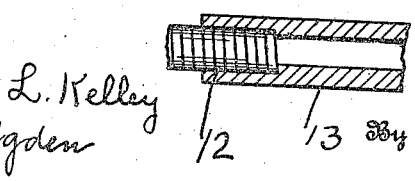

WAYNE S. SEARLES, OF PROVIDENCE, RHODE ISLAND.

EYEGLASS-TEMPLE ATTACHMENT.

1,034,651.
Specification of Letters Patent.
Patented Aug. 6, 1912.

Application filed November 18, 1911. Serial No. 661,042.

*To all whom it may concern:*

Be it known that I, WAYNE S. SEARLES, a citizen of the United States, and resident of the city of Providence, in the county of Providence and State of Rhode Island, have invented certain new and useful Improvements in Eyeglass-Temple Attachments, of which the following is a specification.

This invention relates to that class of spectacles which are provided with temples, each having one end curved into the form of a loop to pass around behind the ear of the wearer.

It has been found that in many cases the skin behind the ears is extremely tender and delicate and becomes easily irritated and cut by the ear loop on the spectacle temples when the same are formed of plain small wire. To obviate this difficulty these loops are often covered with such material as chamois, rubber, or the like, to enlarge and soften the contacting surface, but these materials are not satisfactory as they soon become soiled and in the case of rubber the oil and acids of the skin attack and soon destroy the same.

The object of my present invention is to provide a spectacle temple attachment which will obviate this difficulty, the same comprising an extremely soft and flexible tubular metallic member having its body portion formed into a perfectly smooth surfaced helical coil, the same being adapted to be quickly applied to the loop of any temple by any optician and as readily secured thereto by bending the end of the wire, whereby an enlarged soft spring or yielding cushion surface is provided to the loop to prevent irritating, cutting or abrading the tender skin behind the ear.

With these and other objects in view, the invention consists of certain novel features of construction, as will be more fully described and particularly pointed out in the appended claims.

Of the accompanying drawings: Figure 1— is an enlarged side elevation illustrating my improved attachment as applied to the loop portion of a spectacle temple. Fig. 2— shows the loop portion of the ordinary spectacle temple enlarged. Fig. 3— shows a detail of my improved temple attachment. Fig. 4— is an enlarged detail in section showing the means by which the attachment is connected to the temple and the ball applied to the end thereof. Fig. 5— shows a modified construction of my improved temple attachment.

Referring to the drawings, 1 designates the usual spectacle temple which is provided at its free end with a curved portion 2, commonly known as the ear loop, at the end of which is usually attached a ball or knob 3, or other finish for the temple.

My attachment for the temple is preferably constructed of an elongated tubular body 4, preferably of precious metal and said tube has a groove or channel 5 cut in a helical form completely through the shell thereof into the hollow center portion and throughout the major portion of the length of its body portion, leaving ends 6 and 7 plain and uncut. The end 6 is preferably beveled as at 8 to form a better finish where it joins the main portion of the temple wire, and the edge 9 at the opposite end of the tube may be turned or flared outwardly and a ball 10, or other suitable hollow device swaged, soldered or otherwise fixed onto this flared end 9 for the purpose of closing the tube at this end. When it is desired to apply this flexible yielding helically formed member to the loop of a temple it is only necessary to snip or cut the ball 3 from the end of the temple and then pass this tubular member up over this wire loop, the flexibility of the member causing it to readily follow the curvature of the loop until the end 11 of the loop enters the ball at the end of the tube. In order to firmly and securely fasten this member to the loop it is only necessary to now bend the plain portion 7 of the tube together with that portion of the loop contained therein slightly backward with a pair of pliers, into the form illustrated in Figs. 1 and 4, the curvature of which effectually prevents the wire from being withdrawn from the member and also provides a neat finish for the end of the temple. By cutting a tubular body of this character with a helical channel renders the tube extremely soft, pliable and yieldable and when applied to the ear loop of a temple its yielding qualities and smooth engaging surface do not irritate upon coming in constant contact with the tender skin behind the ear.

I do not wish to be restricted to the construction of a temple attachment in the exact manner above described, as the same may be constructed by winding a wire on a small arbor into an elongated helical coil 12, forming a very flexible tubular body portion. The outer surface of this body may then be placed in a reducing machine and flattened, if desired, so as to provide a perfectly smooth outer or engaging surface. The wire at each end of this coil may be secured or bound together by solder, or otherwise, or a short tubular member 13 may be attached to one or both of these coil ends, if desired, in the manner illustrated in Fig. 4, to provide a finish at the inner end and to also provide a portion at the opposite end adapted to be bent for the purpose of securing the member in position on the temple loop.

A member of the character described may be constructed and sold at very small expense and carried in stock by the opticians generally, any of whom can apply these attachments to any temple at a very small expense, thereby saving the consumer the cost of an entirely new pair of temples.

I claim:

1. A spectacle temple attachment comprising a flexible tubular member having its body portion formed into an elongated helical coil for a portion of its length and having a plain or ungrooved portion at either end thereof, said member adapted to be readily applied to the ear loop of a temple and having its outer plain end bent to secure it firmly in position on the temple.

2. A spectacle temple attachment comprising a flexible metal tubular member having a helical groove or channel cut through its body for a portion of its length leaving a portion at one or both ends plain or intact whereby said member is adapted to be readily applied to the ear loop of a temple.

3. In a spectacle, a temple, an attachment for said temple comprising a flexible metal tubular member having a helical groove or channel cut through its body for a portion of its length leaving a portion at one or both ends plain or intact, a finishing member attached to the outer end of said tube for closing the same, said plain end portion being adapted to be bent with the inclosed end to said temple loop to secure the two together.

In testimony whereof I affix my signature in presence of two witnesses.

WAYNE S. SEARLES.

Witnesses:
 HOWARD E. BARLOW,
 E. I. OGDEN.